United States Patent
Mueller et al.

[11] Patent Number: 5,997,976
[45] Date of Patent: Dec. 7, 1999

[54] ETCHED MOLD SURFACE FOR USE IN MAKING LIGHT-READABLE DISCS

[75] Inventors: William R. Mueller, Clarks Summit; Michael McHale, Dunmore; Thomas Havrichak, Peckville, all of Pa.

[73] Assignee: WEA Manufacturing Inc., Olyphant, Pa.

[21] Appl. No.: 09/022,668

[22] Filed: Feb. 12, 1998

[51] Int. Cl.⁶ ........................................................ B32B 3/00
[52] U.S. Cl. ........................ 428/64.1; 428/64.4; 428/64.5; 428/457; 428/913; 430/270.11; 430/495.1; 430/945; 369/283; 369/288; 216/24
[58] Field of Search ................... 428/64.1, 64.2, 428/64.4, 64.5, 457, 913; 430/270.11, 495.1, 945; 369/275.1, 283, 288; 216/24

[56] References Cited

U.S. PATENT DOCUMENTS

| | | | |
|---|---|---|---|
| 3,689,078 | 9/1972 | Ban | 274/42 P |
| 4,629,668 | 12/1986 | Hamersley et al. | 430/11 |
| 4,967,286 | 10/1990 | Nomula et al. | 358/342 |
| 4,972,404 | 11/1990 | Yamaguchi et al. | 369/384 |
| 5,068,846 | 11/1991 | Kramer | 369/275.1 |
| 5,138,604 | 8/1992 | Umeda et al. | 369/103 |
| 5,398,231 | 3/1995 | Shin et al. | 369/275.4 |
| 5,470,627 | 11/1995 | Lee et al. | 428/64.4 |
| 5,729,533 | 3/1998 | Marquardt | 369/273 |
| 5,766,495 | 6/1998 | Palette | 216/54 |

FOREIGN PATENT DOCUMENTS

| | | | |
|---|---|---|---|
| 0 063 439 A1 | 10/1982 | European Pat. Off. | G11B 7/24 |
| 0 437 223 A2 | 7/1991 | European Pat. Off. | G11B 7/24 |
| 0 514 156 A2 | 11/1992 | European Pat. Off. | G11B 23/40 |
| 0 517 490 A2 | 12/1992 | European Pat. Off. | G11B 7/24 |
| 0 598 575 A2 | 5/1994 | European Pat. Off. | G11B 7/24 |
| 0 671 730 A1 | 9/1995 | European Pat. Off. | G11B 7/00 |
| 0 704 843 | 4/1996 | European Pat. Off. | G11B 7/24 |
| 0 706 178 A2 | 4/1996 | European Pat. Off. | G11B 7/26 |
| 2 710 443 A1 | 3/1995 | France | G11B 7/26 |
| 5054599 | 3/1993 | Japan | G11B 23/38 |
| 8-194972 | 7/1996 | Japan | G11B 7/24 |
| 2203278 | 10/1988 | United Kingdom | G11B 7/24 |
| WO 95/04352 | 2/1995 | WIPO | G11B 7/00 |

OTHER PUBLICATIONS

F. Vizard, "Video's New Look," *Popular Mechanics*, at 32 (May 1995).

*Primary Examiner*—Elizabeth Evans
*Attorney, Agent, or Firm*—Fish & Neave; Robert R. Jackson; Brett G. Alten

[57] ABSTRACT

Methods and apparatus for making optical discs (e.g., for use in digital versatile discs ("DVDs") are provided. An optical disc made in accordance with this invention includes at least one roughened surface portion to mask any manufacturing irregularities and thereby improve the appearance of the disc and, if the disc is used in a DVD, then also the DVD. The method includes roughening a section of a mold in contact with molten plastic, molding an optical disc with that mold so that at least one side of the optical disc has a roughened surface portion, and if the disc is used in a DVD, securing the disc to another disc with adhesive to form a DVD.

26 Claims, 1 Drawing Sheet

ETCHED MOLD SURFACE FOR USE IN MAKING LIGHT-READABLE DISCS

BACKGROUND OF THE INVENTION

This invention relates to plastic information discs such as digital versatile discs ("DVDs"), compact discs ("CDs"), compact disc read-only memories ("CD ROMs"), and the like, and more particularly to providing an improved aesthetic appearance to surfaces of such light-readable discs.

The information storage capacity of DVDs is large, in part because a DVD comprises two optical discs (each like a CD but with even greater information storage capacity) secured back-to-back (see, for example, U.S. patent application Ser. No. 08/579,302, filed Dec. 27, 1995, the entire contents of which are hereby incorporated by reference herein). The large capacity may be used to record movies and other similar real-time audio/visual programming on discs.

The making of a DVD involves many manufacturing steps during which a surface of the DVD or one of the constituent optical discs can be damaged. For example, a DVD or the constituent optical discs are normally handled with one or more suction devices between manufacturing steps. When a particle, such as a dust particle, is squeezed between an DVD or optical disc surface and the suction device, that surface may be scratched if the suction device moves relative to the disc surface. Also, a suction device may grip the surface of the optical disc before the disc is completely hardened. In that case, the suction device may leave a mark on the surface of the disc where the suction device was in contact with the disc surface. Such defects are especially noticeable when the surface is coated with a reflective material, such as a metal coating, which provides a striking mirror-like finish.

The mirror-like finish may also cause another problem. During manufacture, suction devices repeatedly pick-up and release a disc. However, when the disc surface is smooth, and especially when metallized, the mirror-like surface may make release of the disc more difficult because the suction device cannot vent quickly. Furthermore, the metallized coating may also tend to increase the attractive force that results from a build-up of static electricity.

Still another problem that may adversely affect the appearance of a DVD is unevenness or voids in the adhesive that is used to secure the two optical discs back to back in the DVD. This type of defect tends to be most noticeable near the center of the DVD where no information is recorded and where the constituent optical discs may not be metallized. Thus, such a defect becomes clearly visible through the smooth clear plastic of the constituent optical discs.

In view of the foregoing, it is an object of this invention to provide an improved method of molding an optical disc, especially an optical disc that will be used in a DVD.

It is a more particular object of this invention to provide a method of molding an optical disc so that subsequent handling of that disc is facilitated.

It is yet another object of this invention to provide DVDs that have an improved aesthetic appearance.

SUMMARY OF THE INVENTION

These and other objects of the invention are accomplished in accordance with the principles of the invention by providing methods and apparatus for manufacturing optical discs so that portions of the discs that do not contain information but that are subject to damage during handling or that will reveal defects in the adhesive used to secure two discs together in a DVD are roughened so that they have a frosted appearance which masks or at least makes less noticeable scratches on those disc portions or adhesive defects behind those disc portions.

A DVD includes a first optical disc and a second optical disc. Each of the optical discs has a front side and a back side, the back sides of the first and second discs being secured to each other so that the front sides form respective outer surfaces of the DVD. At least one of the sides of one of the optical discs has a roughened surface portion. Preferably, that roughened surface portion has a substantially uniform roughness to mask manufacturing irregularities and provide an aesthetically acceptable appearance.

A method of making a DVD in accordance with this invention includes roughening a section of a first mold, molding a first disc with the first mold so that a side of that disc has a roughened surface portion, and securing with adhesive the back sides of two optical discs. Preferably, the roughened section is substantially uniformly rough, and most preferably roughened by electric discharge machining ("EDM").

Further features of the invention, its nature and various advantages, will be more apparent from the accompanying drawings and the following detailed description of the preferred embodiments.

DETAILED DESCRIPTION OF THE PREFERRED EMBODIMENTS

For purposes of illustration, the invention will be described in the context of its application to digital versatile discs ("DVDs"), which are also sometimes referred to as digital video discs. It will be understood, however, that the invention is equally applicable to other types of information recording discs, such as CDs and CD ROMs.

Figure 1:
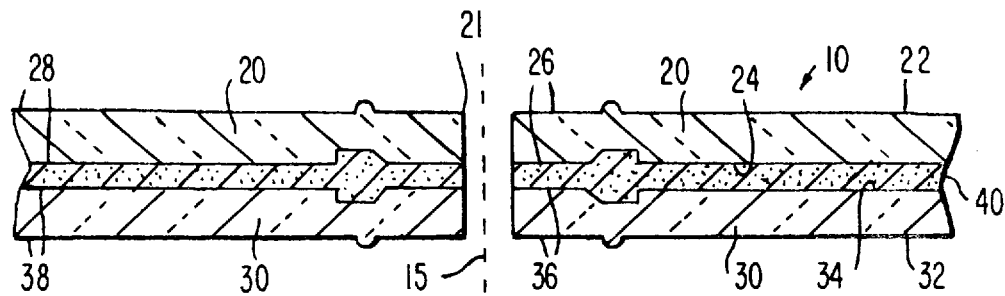
FIG. 1 is a simplified cross sectional view of an illustrative DVD formed from two optical discs made in accordance with this invention. Vertical dimensions are exaggerated relative to horizontal dimensions in FIG. 1 to make certain features of the structure more visible.

FIG. 1 shows a cross-section of DVD 10, which includes first optical disc 20 and second optical disc 30. Optical discs 20 and 30 may be transparent plastic, but could be any substantially transparent moldable material. Optical disc 20 has front side 22 and back side 24, and optical disc 30 has front side 32 and back side 34. Back sides 24 and 34 are secured to each other, usually by adhesive 40, so that front sides 22 and 32 form respective outer surfaces of DVD 10. Then, any information recorded on back sides 24 and 34 is light-readable through the outer surfaces of discs 20 and 30 and protected from damage during use of DVD 10. However, during the manufacture of DVD 10, including the manufacture of individual optical discs 20 and 30, the optical discs may become visibly damaged by manufacturing equipment, especially on radially inner portions 26 and 36 and radially outer portions 28 and 38 of optical discs 20 and 30, respectively. While such damage does not compromise performance, it may degrade the aesthetic appearance of a conventional DVD. Similarly, unevenness or voids in the adhesive between disc portions 6 and 36 may be visible and unattractive, especially if the back sides of these portions are not metallized.

In contrast to a conventional DVD, however, a DVD in accordance with the present invention has a roughened surface on at least one side of at least one of optical disc portions 26 and 36 and/or portions 28 and 38 to mask manufacturing irregularities in this portion of the DVD and thereby improve the overall appearance of the product. The roughened surface portion may have a substantially uniform roughness, or the roughness may be varied somewhat to form a design. As used herein, a surface that has a substantially uniform roughness is any surface that has randomly distributed microscopic irregularities.

Preferably, the roughened disc surface portions are provided by electric discharge machining ("EDM") a corresponding section of that disc's mold with an electric discharge machine (such as those available from Sodick Co., Ltd., of Kanagawa, Japan). EDM is a process that involves applying a potential difference between an electrode and an electrically conductive workpiece to cause electric discharge therebetween. The impact of the discharge against the workpiece causes the workpiece to be machined. Different roughnesses may be achieved by varying certain operating parameters, such as the magnitude and time-dependence of the electric potential, as well as the electrode-workpiece distance. One well-known roughness scale jointly developed by the Society of Plastic Industry and Society of Plastic Engineers is the "SPI/SPE" standard scale. According to this scale, a preferred roughness is about SPI/SPE #5, which approximately corresponds to a roughness of #S-2, as measured on another roughness scale defined by Sodick Co., Ltd.

Figure 3:
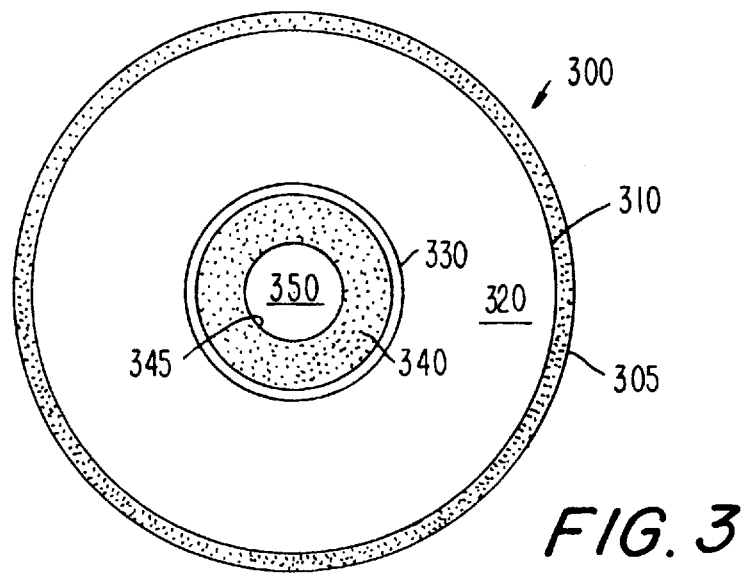
FIG. 3 is a simplified elevational view of illustrative optical disc made in accordance with this invention.

The roughened surface portions may be provided anywhere on the surface of an optical disc where information is not recorded. FIGS. 1 and 3 show different portions of optical discs that can be roughened according to this invention. For example, FIG. 1 illustrates that a roughened portion may be provided on either surface of an optical disc on a region that extends from radial inner edge 21 up to any radial position at which information is recorded. Typically, information is not recorded closer than about 23 millimeters from central rotational axis 15 of optical disc 20. Similarly, FIG. 3 shows another view of an embodiment of a DVD made in accordance with this invention. DVD 300 includes roughened portions 310 and 340 next to radially outer edge 305 and radially inner edge 345, respectively. Portions 310 and 340 are surfaces that may be handled by manufacturing machines and are particularly susceptible to manufacturing defects. The roughened surfaces mask these defects, thereby providing an aesthetically more acceptable appearance.

As explained more fully below, a reflective coating may be deposited on the roughened surface portion of the optical disc. The reflective coating may be the same material used to coat the information bearing portion of the disc (such as aluminum), or it may be any other coating material (such as paint). Any number of materials having different colors may also be disposed on the roughened portion to form colorful artwork as well.

A method in accordance with this invention for making DVDs with at least one roughened surface portion is now described. As described above, conventional DVDs have mirror-like surfaces that are formed from complementary smooth sections of the mold used to make the disc. Unfortunately, these mirror-like DVD surfaces make any cosmetic defects very noticeable. A method according to this invention uses a mold section with a roughened surface—not a smooth surface, so that the molded optical disc has a complementary roughened surface portion. To some extent this method has already been mentioned, so the discussion here may be somewhat abbreviated.

Figure 2:
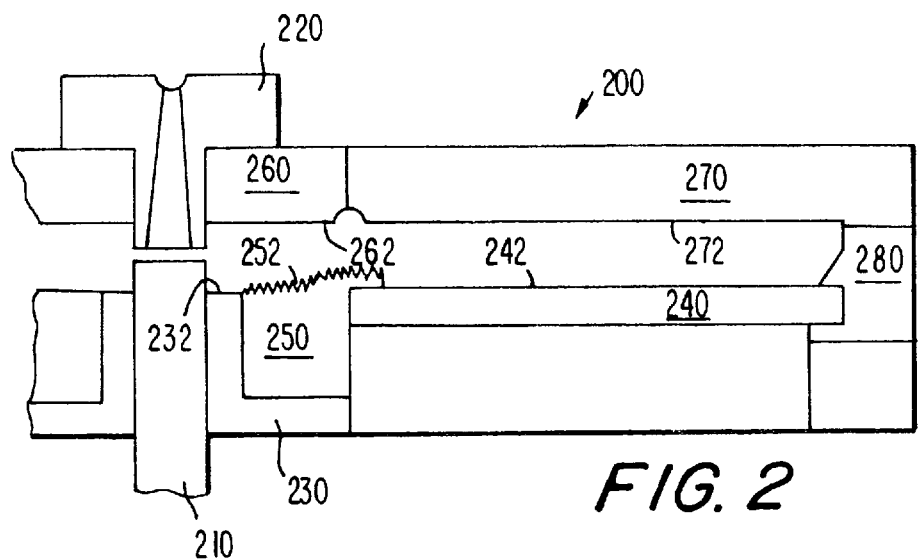
FIG. 2 is a simplified sectional view of one half of an illustrative mold used to form an optical disc in accordance with this invention. Again, vertical dimensions are exaggerated relative to horizontal dimensions in FIG. 2.

In a first step, a surface section of a mold component is roughened, preferably until that section is substantially uniformly rough. As shown in FIG. 2, mold 200 may include a variety of components, including axially located punch 210 and sprue bushing 220. Stationary bushing 230, stamper 240, stamper holder 250, female bushing 260, mirror block 270, stamper holder ring 280, and support ring 290 are all mounted around punch 210 and bushing 220. Together, stamper surface 242 of stamper 240, stamper holder surface 252 of holder 250, bushing surface 262 of bushing 260, and block surface 272 of block 270 form a majority of the surface area in contact with molten plastic during molding that forms the optical disc.

Usually, most of stamper surface 242 is used to record information on the back side of the disc, so only the unused portions of surface 272 that are opposite unused portions of surface 242 may be roughened according to this invention. This is because, in order to provide a substantially clear optical pathway for reading the information recorded on the back side, the opposing front surface of the disc (which is formed with mirror block surface 272) should not be roughened. Any other surface of the mold in contact with the molten plastic, however, may be roughened in accordance with this invention. In particular, surface 252 of stamper holder 250 is preferably roughened in accordance with this invention using EDM.

In addition or as an alternative to stamper holder surface 252, any other molding surface, or section, in contact with the optical disc may be roughened in accordance with this invention. For example, FIG. 3 shows one side of a typical optical disc that forms half of a DVD. Disc 300 has central aperture 350, inner surface portion 340, stacking ring 330, central recordable portion 320, and outer surface portion 310. Portions 310 and 340 may be roughened in accordance with this invention. Roughened portion 340 or 310 of disc 300 may correspond to an inner or outer circumferential edge portion of stamper 240 and mirror block 270. Also, roughened portion 340 may correspond to roughened surface 252 of stamper holder 250, roughened surface 262 of bushing 260, or roughened surface 232 of bushing 230. The magnitude, location, and exact roughness of the roughened section may be selected as desired.

In a second step, after a section of the mold is roughened, an optical disc is molded with a roughened surface portion that corresponds to that roughened mold section. And, after being molded, the back side of the optical disc is secured with adhesive to the back side of another disc. As described above, both discs may be provided with roughened portions according to this invention. Preferably, the back sides of the discs are secured together with adhesive. In this way, the roughened portions substantially masks any irregularities in the adhesive that may otherwise appear through the transparent plastic disc. The method may further include coating the roughened surface portions before the back sides of the discs are secured.

It will be understood that the foregoing is only illustrative of the principles of this invention, and that various modifications can be made by those skilled in the art without departing from the scope and spirit of the invention. For example, the various dimensions and materials mentioned herein are preferred, but other dimensions and materials can be used if desired.

The invention claimed is:

1. A digital versatile disc comprising a first optical disc and a second optical disc, each of said optical discs having a front side and a back side, said back sides being secured to each other so that said front sides form respective outer surfaces of said versatile disc, wherein at least one of said sides of said first optical disc has a roughened surface portion having a substantially uniform roughness to mask manufacturing irregularities and provide an aesthetically acceptable appearance, and wherein said roughened surface portion is formed from a mold section subject to electric discharge machining.

2. The digital versatile disc of claim 1 wherein said roughened surface portion has a roughness of about SPI/SPE #5.

3. The digital versatile disc of claim 1 wherein said back sides are secured to each other with adhesive.

4. The digital versatile disc of claim 1 wherein said roughened surface portion extends radially between a radial inner edge of said at least one side up to less than about 23 millimeters from a central rotational axis of said first optical disc.

5. The digital versatile disc of claim 1 further comprising a reflective coating deposited on said roughened surface portion.

6. A mold for making an optical disc, said optical disc having a front side on which information is recordable and a back side, said mold comprising:
    a stamper having a surface for recording information on an annular portion of said back side of said disc; and
    at least one other mold component having a roughened section in contact with said disc for imparting a complementary roughened portion on said disc, wherein said roughened section is made rough by electric discharge machining.

7. The mold of claim 6 wherein said roughened section has a substantially uniform roughness.

8. The mold of claim 7 wherein said roughened portion is adjacent said annular portion of said back side of said disc.

9. The mold of claim 8 wherein said roughened portion is another annular portion concentric with and radially inside said first annular portion.

10. The mold of claim 8 wherein said roughened portion is another annular portion concentric with and radially outside said first annular portion.

11. A method of making a digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said method comprising:
    roughening a section of at least one of said surfaces of said first respective mold so that said section is substantially uniformly rough, wherein said section is roughened by an electric discharging machine;
    molding said first optical disc with said first respective mold so that said back side of said first optical disc has a roughened surface portion; and
    securing with adhesive said back sides of said optical discs.

12. A method of making a digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, wherein said another mold component is selected from the group consisting of a stamper holder, a stationary bushing, a female bushing, and a mirror block, said method comprising:
    roughening a section of at least one of said surfaces of said first respective mold so that said section is substantially uniformly rough;
    molding said first optical disc with said first respective mold so that said back side of said first optical disc has a roughened surface portion; and
    securing with adhesive said back sides of said optical discs.

13. The method of claim 12 wherein said section is roughened until its surface has an EDM standard roughness of about SPI/SPE #5.

14. A method of making a digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said method comprising:
    roughening a section of at least one of said surfaces of said first respective mold so that said section is made substantially uniformly rough by electric discharge machining;
    molding said first optical disc with said first respective mold so that said back side of said first optical disc has a roughened surface portion;
    roughening another section of said second respective mold;
    molding said second optical disc with said second respective mold so that at least one of said sides of said second optical disc has a second roughened surface portion; and
    securing with adhesive said back sides of said optical discs.

15. The method of claim 14 further comprising metallizing said second roughened surface portion of said second optical disc before said securing.

16. A method of making a digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said method comprising:
    roughening a section of at least one of said surfaces of said first respective mold so that said section is made substantially uniformly rough by electric discharge machining;
    molding said first optical disc with said first respective mold so that said back side of said first optical disc has a roughened surface portion;
    metallizing said roughened surface portion of said first optical disc; and securing with adhesive said back sides of said optical discs after said metallizing.

17. A method of making a digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said method comprising:

roughening a section of at least one of said surfaces of said first respective mold so that said section is substantially uniformly rough;

molding said first optical disc with said first respective mold so that said back side of said first optical disc has a roughened surface portion; and securing with adhesive said back sides of said optical discs;

wherein said roughening comprises roughening a section of said another mold component so that said roughened portion extends radially between a radial inner edge of said back side of said first optical disc up to less than about 23 millimeters from a central rotational axis of said first optical disc.

18. The method of claim 17 wherein said roughening comprises roughening said another mold component that is substantially in contact with said first optical disc during molding.

19. A method of making a digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said method comprising:

roughening a section of at least one of said surfaces of said first respective mold so that said section is made substantially uniformly rough by electric discharge machining;

molding said first optical disc with said first respective mold so that said back side of said first optical disc has a roughened surface portion; and securing with adhesive said back sides of said optical discs;

wherein said roughening comprises roughening a section of said another mold component so that said roughened portion is along a circumferential edge of one of said sides of said first optical disc.

20. The method of claim 19 wherein said roughening comprises roughening a section of said another mold component so that said roughened portion is provided along an outer circumferential edge of one of said sides of said first optical disc.

21. A digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said disc being made according to a method comprising:

roughening a section of at least one of said surfaces of said first respective mold so that said section is substantially uniformly rough, wherein said section is roughened by an electric discharging machine;

molding said first optical disc with said first respective mold so that said back side of said first optical disc has a roughened surface portion; and securing with adhesive said back sides of said optical discs.

22. A digital versatile disc made according to a method comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, wherein said another mold component is selected from the group consisting of a stamper holder, a stationary bushing, a female bushing, and a mirror block, said disc being made according to a method comprising:

roughening a section of at least one of said surfaces of said first respective mold so that said section is substantially uniformly rough;

molding said first optical disc with said first respective mold so that said back side of said first optical disc has a roughened surface portion; and securing with adhesive said back sides of said optical discs.

23. A digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said disc being made according to a method comprising:

roughening a section of at least one of said surfaces of said first respective mold so that said section is made substantially uniformly rough by electric discharge machining;

molding said first optical disc with said first respective mold so that said back side of said first optical disc has a roughened surface portion;

roughening another section of said second respective mold;

molding said second optical disc with said second respective mold so that at least one of said sides of said second optical disc has a second roughened surface portion; and securing with adhesive said back sides of said optical discs.

24. A digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said disc being made according to a method comprising:

roughening a section of at least one of said surfaces of said first respective mold so that said section is made substantially uniformly rough by electric discharge machining;

molding said first optical disc with said first respective mold so that said back side of said first optical disc has a roughened surface portion;

metallizing said roughened surface portion of said first optical disc; and securing with adhesive said back sides of said optical discs after said metallizing.

25. A digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said disc being made according to a method comprising:

roughening a section of at least one of said surfaces of said first respective mold so that said section is substantially uniformly rough;

molding said first optical disc with said first respective mold so that said back side of said first optical disc has a roughened surface portion; and securing with adhesive said back sides of said optical discs;

wherein said roughening comprises roughening a section of said another mold component so that said roughened portion extends radially between a radial inner edge of said back side of said first optical disc up to less than about 23 millimeters from a central rotational axis of said first optical disc.

26. A digital versatile disc comprising a first optical disc and a second optical disc, each of said optical discs having a front side and a back side, each of said optical discs being formed from a respective mold having a stamper surface for recording information on said back side and another mold component surface, said back sides being secured to each other so that said front sides form respective outer surfaces of said versatile disc, said disc being made according to a method comprising:

roughening a section of at least one of said surfaces of said first respective mold so that said section is substantially uniformly rough;

molding said first optical disc with said first respective mold so that said back side of said first optical disc has a roughened surface portion; and securing with adhesive said back sides of said optical discs;

wherein said roughening comprises roughening a section of said another mold component so that said roughened portion is along a circumferential edge of one of said sides of said first optical disc.

* * * * *